(12) United States Patent
Logothetis et al.

(10) Patent No.: US 12,234,079 B2
(45) Date of Patent: Feb. 25, 2025

(54) HANDHELD DISPENSER FOR DISPENSING A POWDER

(71) Applicant: EZYCORP LIMITED, Birmingham (GB)

(72) Inventors: Constantine Michael Logothetis, Birmingham (GB); Artur Zolkiewicz, Birmingham (GB); Alexander Beard, Birmingham (GB); James Melia, London (GB)

(73) Assignee: EZYCORP Limited, Birmingham (GB)

( * ) Notice: Subject to any disclaimer, the term of this patent is extended or adjusted under 35 U.S.C. 154(b) by 377 days.

(21) Appl. No.: 17/756,761

(22) PCT Filed: Nov. 30, 2020

(86) PCT No.: PCT/GB2020/053070
§ 371 (c)(1),
(2) Date: Jun. 1, 2022

(87) PCT Pub. No.: WO2021/111115
PCT Pub. Date: Jun. 10, 2021

(65) Prior Publication Data
US 2023/0011151 A1 Jan. 12, 2023

(30) Foreign Application Priority Data

Dec. 2, 2019 (GB) ..................................... 1917556

(51) Int. Cl.
*B65D 83/06* (2006.01)
*G01F 11/24* (2006.01)
*G01F 19/00* (2006.01)

(52) U.S. Cl.
CPC .............. *B65D 83/06* (2013.01); *G01F 11/24* (2013.01); *G01F 19/002* (2013.01)

(58) Field of Classification Search
CPC ........ B65D 83/06; G01F 11/24; G01F 19/002
See application file for complete search history.

(56) References Cited

U.S. PATENT DOCUMENTS 9,359,184 B2 * 6/2016 Post ..................... B67D 7/3281
9,400,200 B2 * 7/2016 Rusch .................... B65D 83/06
(Continued)

FOREIGN PATENT DOCUMENTS

DE 4200336 A1 7/1993
WO WO 2015/050949 A1 4/2015

OTHER PUBLICATIONS

International Search Report, International Application No. PCT/GB2020/053070, mailing date Mar. 11, 2021, 3 pages.

*Primary Examiner* — Jeremy Carroll
(74) *Attorney, Agent, or Firm* — Husch Blackwell LLP (57) ABSTRACT

A handheld dispenser (10) for dispensing a powder. The dispenser (10) comprises a container (12) comprising a first opening (14), and a powder storage volume (16) for storing the powder (100). The dispenser (10) also comprises a rotatable member (18), located in the container (12); and a handle (20) connected to the rotatable member (18). The dispenser (10) also comprises an actuator (22) at least partially located on the handle (20), wherein the actuator (22) is actuatable to rotate the rotatable member (18) in the container (12) for allowing powder (100) located in the powder storage volume 16 of the container to travel past the rotatable member (18) and out from the first opening (14). The powder storage volume (16) is preferably no more than 200 ml.

19 Claims, 11 Drawing Sheets

(56) References Cited

U.S. PATENT DOCUMENTS

| | | | |
|---|---|---|---|
| 9,903,746 B2* | 2/2018 | Rusch | G01F 11/24 |
| 11,105,671 B2* | 8/2021 | Jangsäter | G01F 11/42 |
| 11,452,394 B2* | 9/2022 | Morello | G01F 11/24 |
| 2010/0326851 A1 | 12/2010 | Mangin et al. | |
| 2013/0092711 A1* | 4/2013 | Hu | B65D 83/06 |
| | | | 222/428 |
| 2015/0246742 A1 | 9/2015 | Gold et al. | |

* cited by examiner

HANDHELD DISPENSER FOR DISPENSING A POWDER

PRIORITY CLAIM

The present application is a National Phase entry of PCT Application No. PCT/GB2020/053070, filed Nov. 30, 2020, which claims priority from Great Britain Application No. 1917556.1, filed Dec. 2, 2019, each of which is hereby fully incorporated herein by reference.

TECHNICAL FIELD

The present disclosure is principally concerned with a handheld dispenser for dispensing a powder.

BACKGROUND

In the context of dispensing powders, such as for dispensing food powders (for instance a food supplement powder, such as a protein powder), the powders are usually sold in a plastic vessel, such as a plastic tub, comprising the powder along with a plastic scoop. The plastic scoop allows the user to scoop up powder from the plastic tub and then pour out the scooped-up powder into a receptacle, where the powder can then be mixed up with a liquid as required to make food, for instance a protein shake.

In the above instances, the plastic scoop is often flimsy, making it difficult to operate by the user in terms of being able to pick up the required amount of powder, and also in terms of being able to accurately dispense a particular amount of the powder from the scoop into the receptacle.

The present disclosure is directed to an improved handheld dispenser for dispensing a powder, and also corresponding methods for using the same.

SUMMARY

Aspects of the disclosure are set out in the accompanying claims.

In that respect, in accordance with a first aspect there is provided a handheld dispenser for dispensing a powder, the dispenser comprising:
  a container comprising a first opening, and a powder storage volume for storing the powder;
  a rotatable member, located in the container;
  a handle connected to the rotatable member; and
  an actuator at least partially located on the handle, wherein the actuator is actuatable to rotate the rotatable member in the container for allowing powder located in the powder storage volume of the container to travel past the rotatable member and out from the first opening;
  wherein the powder storage volume is no more than 200 ml.

The provision of a rotatable member, which is rotated by an actuator at least partially located on the handle, of the dispenser allows a user thereof to conveniently control the powder amount of powder dispensed from the dispenser, by appropriate rotation of the rotatable member via the actuator. Tying in with this, the fact that the actuator is at least partially located on the handle particularly facilitates making it easier for the user to control the operation of the rotatable member, by placing the actuator is in a readily reachable position on the dispenser.

In accordance with some embodiments, the rotatable member may comprise a plurality of paddles which define spaces between the paddles for receiving powder, wherein rotation of the rotatable member is operable to allow powder located in the container to travel in the spaces between the paddles and out from the first opening. The paddles act to separate spaces to thus provide for a plurality of spaces which might each be used to dispense a predetermined metered amount of powder related to the size of each space. In particular embodiments where the amount of powder to be dispensed will normally be the same each time, in such embodiments, the spaces may be the same size.

In the above embodiments where the rotatable member comprises the plurality of paddles, in some very particular embodiments the rotatable member may comprise four paddles and four spaces.

In some embodiments of the dispenser, the actuator may comprise a sleeve portion of the handle, wherein the sleeve portion is rotatable relative to the container and is connected to the rotatable member, wherein rotation of the sleeve portion relative to the container is configured to rotate the rotatable member in the container for allowing powder located in the container to travel past the rotatable member and out from the first opening. In this way, the sleeve portion acts as a particularly convenient mechanism for controlling the operation of the rotatable member, which is particularly easy for the user to both operate; control; and reach.

In at least some of the above embodiments, the actuator may comprise a shaft member located inside the handle, wherein the sleeve portion is connected to the rotatable member by the shaft member. In a particular embodiment, a first end of the shaft member may be connected to the rotatable member, and a second end of the shaft member may be connected to the sleeve portion. In these embodiments, the provision of the shaft member inside the handle assists with reducing the number of exposed working parts on the dispenser. This is particularly advantageous, since hiding the working parts better prevents them from being potentially clogged up with powder in use, such to improve the reliability of the dispenser.

In some particular embodiments of the dispenser, the handle may comprise a distal end connectable to the container, and proximal end located opposite the distal end. This provision of the distal and proximal ends (the proximal end, during use of the dispenser, being closer to the user than the distal end is to the user) on the handle better allows the dispenser to be gripped by the user—particularly in instances when the dispenser is being used to pick up powder from inside the confines of a powder-containing vessel/tub, where the dispenser might be otherwise more difficult to grip.

In the previous embodiments, in some particular embodiments thereof, a cap member may be attached to the proximal end of the handle, wherein the cap member comprises an attachment means for attaching the dispenser to another object when the dispenser is not in use. Possible attachment means might include, for example, a hook, a hoop of material, or a clip.

In principle, the dispenser can be filled with powder through the first opening, and by rotation of the rotatable member to allow the powder to travel past the rotatable member and into the powder storage volume of the container. However, to facilitate the addition of powder into the powder storage volume of the container, in some embodiments of the dispenser, the container may comprise a second opening for allowing the powder storage volume of the container to be filled with powder. In some of these embodiments, the first opening may be located at a first end of the container, and the second opening may be located at a second end of the container which is opposite the first end.

In terms of the geometry of the dispenser when it comprises the second opening, in accordance with some embodiments therefrom, the second opening may be larger than the first opening, such to make it quicker to fill the powder storage volume with powder. In some embodiments, the second opening may be no more than 60 mm across.

In terms of other geometry for the dispenser, in accordance with some embodiments the first opening may be no more than 30 mm across. With this maximum size, the first opening is better sized to ensure that the dispenser can dispense the powder into a receptacle in a way that reduces the risk of spillage of powder therearound as the powder passes out from the first opening.

In respect of the handle, in accordance with some embodiments of the dispenser, the handle may be telescopically slideable with respect to the container. Such telescopic movement allows the dispenser to occupy a smaller space whilst it is not being used, and also allows the dispenser to be more easily operated inside vessels/tubs that are particularly long or big (e.g., particularly in situations when a user is trying to remove the final bits of powder from a large tub).

In accordance with particular embodiments, the handle may be no more than 120 mm long, and/or at least 50 mm long. Staying with the geometry of the handle, in some embodiments, the handle may be cylindrical, and may have a diameter of less than 20 mm.

The size of the powder storage volume may vary depending on the application of the dispenser. However, a beneficial powder storage volume, which is at least suited for embodiments where the dispenser is used for dispensing food powder (e.g. protein powder), is at least 15 ml and/or no more than 150 ml.

To assist the user in being able to determine the remaining amount of powder in the powder storage volume, in accordance with some embodiments of the dispenser, the container may comprise a plurality of markings for determining a level of powder in the powder storage volume. Such markings might, for instance, comprises a plurality of lines or graduations extending along a side of the container.

Also to assist the user in being able to determine the remaining amount of powder in the powder storage volume, in accordance with some embodiments of the dispenser, the container may be translucent or transparent.

In some embodiments of the dispenser, a cover may be present that is locatable over each opening of the container. The cover might be rigid or flexible as required. In the particular embodiments where the container of the dispenser comprises a first opening and a second opening, in particular embodiments thereof, a flexible cover may be provided which comprises a first portion for covering the first opening, a second portion for covering the second opening, wherein the first and second portions are connected together by a flexible spine of the cover, wherein the flexible spine extends along an outer surface of the container between the first opening and the second opening. In the above embodiments, the cover might in some particular embodiments be made of plastic, or a post consumer recycled, PCR, plastic.

The materials for the dispenser may vary depending on the application of the dispenser. However, particularly where the dispenser is for dispensing food powder (e.g. protein powder), in such embodiments the container, the rotatable member, and the handle, may be made of plastic, such as but not limited to a post consumer recycled, PCR, plastic. Not least in these embodiments, the use of plastic makes the dispenser easier to clean.

The handheld dispenser described above may have a variety of different applications. In accordance with some embodiments which the dispenser would be well suited, the handheld dispenser might be a handheld food powder dispenser, or might in particular be a handheld protein powder dispenser. As will be described however, the handheld dispenser might have other applications such that it might, for instance, be a handheld detergent (such as, but not limited to, a laundry detergent and/or a dishwasher detergent) dispenser.

Noting the above example applications for the dispenser, in accordance with some embodiments of the dispenser, the dispenser has a maximum length of no more than 200 mm.

In accordance with a second aspect there is provided a method of dispensing powder from the handheld dispenser according to the first aspect, wherein the method comprises:
placing powder into the powder storage volume of the container;
locating the first opening of the container over an opening of a receptacle;
actuating the actuator to allow the powder located in the powder storage volume of the container to travel past the rotatable member, out from the first opening of the container, and into the receptacle.

In accordance with some embodiments of this method, the powder may comprise a food powder, which in a very particular embodiment the food powder might comprise a protein powder.

In accordance with a third aspect there is provided an assembly comprising a vessel for powder, and the handheld dispenser according to the first aspect, wherein the dispenser is for receiving the powder from the vessel, and for storing the powder in the powder storage volume of the container of the dispenser.

It will be appreciated that any of the features described in the above embodiments from the first aspect may also optionally/separately be provided as a feature(s) in the second or third aspects as required.

BRIEF DESCRIPTION OF THE DRAWINGS

Aspects of the disclosure will now be described, by way of example only, with reference to the accompanying figures in which.

While the disclosure is susceptible to various modifications and alternative forms, specific embodiments are shown by way of example in the drawings and are herein described in detail. It should be understood however that drawings and detailed description attached hereto are not intended to limit the disclosure to the particular form disclosed but rather the disclosure is to cover all modifications, equivalents and alternatives falling within the spirit and scope of the disclosure.

It will be recognized that the features of the aspects of the disclosure described herein can conveniently and interchangeably be used in any suitable combination. It will also be recognized that the disclosure covers not only individual embodiments but also combinations of the embodiments that have been discussed herein.

DETAILED DESCRIPTION OF THE DRAWINGS

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

With reference to the embodiments shown in the FIGS. 1-5C, there is shown a handheld dispenser 10 for dispensing a powder 100. In general terms, the handheld dispenser comprises a container 12 comprising a first opening 14, and a powder storage volume 16 for storing the powder 100. The handheld dispenser 10 also comprises a rotatable member 18, located in the container 12; and further comprises a handle 20 connected to the rotatable member 18. An actuator 22 is at least partially located on the handle 20, wherein the actuator 22 is actuatable to rotate the rotatable member 18 in the container 12 for allowing powder 100 located in the powder storage volume 16 of the container to travel past the rotatable member 18 and out from the first opening 14.

The size of the powder storage volume 16 is intended to be suited for transferring/storing powder amounts depending on the application of the handheld dispenser 10. With that in mind, as described herein, a principal application of the handheld dispenser 10 is for use in transferring, in a controlled way, food powder, such as food supplement powder or a protein powder, from a vessel in which the powder is located, into a receptacle such as a drink glass or a water bottle. In this principally described operation, the size of the powder storage volume 16 may be no more than 200 ml, since this best balances ensuring a sizeable enough storage volume 16 in which a sufficient quantity of powder can be stored, whilst also not making the volume too large such to make it unwieldy and difficult for the user to controllably dispense powder therefrom using the actuator 22 and the rotatable member 18 of the dispenser 10 as will be described. With reference to the particular embodiments of dispensers 10 shown in FIGS. 5A-5C, which are again also primarily suited for use in transferring food powder, it can be seen in these embodiments that the size of the powder storage volume 16 are collectively in the region of at least 15 ml and no more than 150 ml.

Returning to the structure of the handheld dispenser 10, with reference to the Figures, in accordance with some embodiments the rotatable member 18 may comprise a plurality of paddles 24 which define spaces 26 between the paddles for receiving powder 100. In that way, rotation of the rotatable member 18 is operable to allow powder 100 located in the powder storage volume 16 of the container 12 to travel in the spaces 26 between the paddles 24 and out from the first opening 14. The paddles 24 thus act to separate the spaces 26 to provide for a plurality of spaces 26 which are each useable to dispense a predetermined metered amount of powder 100 related to the size of each space 26. In particular embodiments where the amount of powder 100 to be dispensed will normally be the same each time, such as those embodiments of dispenser 10 shown in the Figures, the spaces 26 may be the same size. In the particular embodiments shown in the Figures, the dispenser 10 is shown as comprising four paddles 24 and four spaces 26.

In accordance with some embodiments of the handheld dispenser 10, such those shown in the Figures, the container 12 may comprise a second opening 28 for allowing the powder storage volume 16 of the container 12 to be filled with powder 100. In some particular embodiments, the first opening 14 may be located at a first end 12A of the container 12, and the second opening 28 located at a second end 12B of the container 12 which is opposite the first end 12A. In such embodiments, the second opening may be larger than the first opening, such to make it quicker to fill the powder storage volume 16 with powder 100. In some particular embodiments, as shown for instance in those from FIGS. 5A-5C, the second opening may be no more than 60 mm across. In that respect, in FIGS. 5A; 5B; and 5C respectively, the second opening 28 is shown as no more than 52 mm, 45 mm, 36 mm respectively across.

In respect of the size of the first opening 14, in accordance with some embodiments the first opening may be no more than 30 mm across. With this maximum size, particularly where the dispenser 10 is used as a food powder dispenser, the first opening 14 is better sized to ensure that the dispenser 100 can dispense the powder 100 into a receptacle in a way that reduces the risk of spillage of powder around the receptacle as the powder passes out from the first opening 12.

Turning to the actuator 22, in accordance with some embodiments such as those shown in FIGS. 2A-2D, the actuator comprises a sleeve portion 34 of the handle 20, wherein the sleeve portion 34 is rotatable relative to the container 12 and is connected to the rotatable member 18. In this way, rotation of the sleeve portion 34 relative to the container 12 is configured to rotate the rotatable member 18 in the container 12 for allowing powder located in the powder storage volume 16 to travel past the rotatable member 18 and out from the first opening 14.

In some embodiments where the sleeve portion 34 is present, the actuator 22 may comprise a shaft member 36 located inside the handle 20, wherein the sleeve portion 34 is connected to the rotatable member 18 by the shaft member 36. In the case of some particular embodiments of the dispenser 10, such as those shown in the FIGS. 1-6, a first end 38 of the shaft member 36 is connected to the rotatable member 18, and a second end 40 of the shaft member 36 is connected to the sleeve portion 34. In such embodiments, the second end 40 of the shaft member 36 may be a proximal end, with the first end 38 being a distal end.

Turning to the handle 20, the handle 20 may comprise a distal end 44 connectable to the container 12, and proximal end 46 located opposite the distal end 44. The geometry of the handle 20 may be shaped as required depending on the application of the dispenser 10. In accordance with particular embodiments, which are suited at least when the dispenser 10 requires inserting into large/deep vessels/tubs of powder, the handle may be at least 50 mm long, and no more than 120 mm long. Staying with the geometry of the handle 20, in some embodiments, the handle 20 may be cylindrical, and may have a diameter of less than 20 mm, as shown with reference to FIGS. 5A-5C, where the handle is shown as having a diameter of around 17 mm. This arrangement makes the handle 20 easy to grip in use, and again makes the handle well sized for use with typical sizes of vessels and tubs of food powder, such as protein powder that are available on the market.

Figure 4:
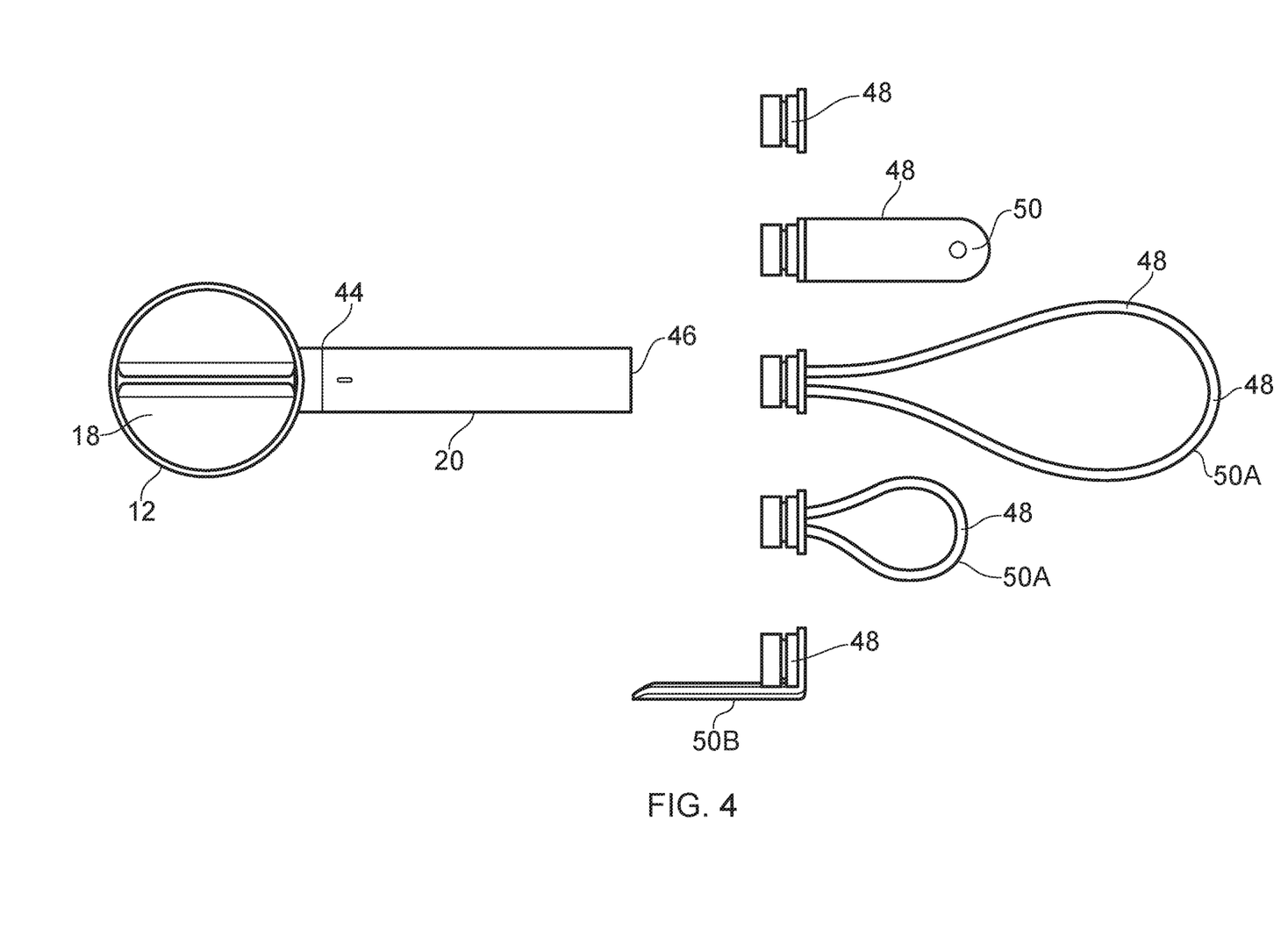
FIG. 4 shows a top view of the dispenser from FIG. 1, wherein the dispenser is also shown as comprising a plurality of interchangeable cap members each attachable to a proximal end of the handle, wherein at least some of the cap members each comprises an attachment means for attaching the dispenser to another object when the dispenser is not in use.

Releasably attached to the proximal end 46 of the handle 20 may be at least one cap member 48. As shown in FIG. 4, in some particular embodiments, the cap member 48 may comprise an attachment means 50 for attaching the dispenser to another object when the dispenser is not in use. Possible attachment means might be a hook, a hoop of material 50A, or a clip 50B, as shown with reference to FIG. 4.

Also in respect of the handle 20, in accordance with some embodiments of the dispenser 10, the handle 20 may be telescopically slideable with respect to the container 12. Such telescopic movement allows the dispenser 10 to occupy a smaller space whilst it is not being used, and also allows the dispenser 10 to be more easily operated inside vessels/tubs that are particularly long or big (e.g. particularly in situations when a user is trying to remove the final bits of powder from a large tub).

It will be seen in at least some of the embodiments of handheld dispenser 10 shown in the Figures that the rotatable member 18 is configured to sit inside the container 12, in position such that the rotatable member 18 is located between the first opening 14 and the powder storage volume 16. In such embodiments, the rotatable member 18 may be locatable in the container 12 by being inserted into the container 12 through the second opening 28 which is sized to receive the rotatable member 14.

In some embodiments, the rotatable member 18 may comprise a first alignment feature 52 (for example a recess or a projection) that is sized to match a corresponding second alignment feature 54 located inside the container 12 (for example a correspondingly shaped projection or recess to the projection/recess forming the first alignment feature 52). In this way, the first and second alignment features 52; 54 assist with orientating the rotatable member 18, and/or its paddles 24 at the correct orientation with respect to the container 12 and the first opening 14. These first and second alignment features 52; 54 are shown best in FIG. 2D.

In accordance with some embodiments, the rotatable member 18 may also comprises a first engagement means 56 (such a hole/projection/slot) that is sized to receive a transmission member 58 forming part of the shaft member 36. The transmission member 58 in these embodiments may comprise the first end 38 of the shaft member 36 that is connectable to the rotatable member 18, and the transmission member 58 may be detachable from the rest of the shaft member 36 which comprises the second end 40 connected to the sleeve portion 34. The transmission member 58 is therefore operable to transmit any actuation force made on the sleeve portion 34 to the rotatable member 18, such to allow the rotatable member 18 to rotate in the container. In the particular embodiment of rotatable member 18 shown in the Figures, the first engagement means 56 from the rotatable member 18 is shown as a slot into which the transmission member 58 of the shaft member 36 is configured to be received in. It will be appreciated that that the shape and/or cross-section of each of the transmission member 58 and the first engagement means 56 may be varied as required, so long as both are able to operate to allow actuation of the actuator 22 to rotate the rotatable member 18 in the container 12.

In such embodiments where the shaft member 36 is present, the shaft member 36 may be connected to the rotatable member 18 that is located in the container 12 through an orifice 60 that is located on the container 12. In these embodiments, and where the transmission member 58 is present, the transmission member 58 may be configured to extend through the orifice 60, and the first engagement means 56 is configured is configured to align with the orifice 60 when the rotatable member 18 is located inside the container 12. In this way, the transmission member 58 extends through the orifice and engages with the first engagement means 56 from the rotatable member 18. Such an arrangement is shown in the embodiment of dispenser shown at least in FIGS. 2A-2D. In some particular embodiments where the transmission member 58 is present, in some of these embodiments, the transmission member 58 may be slideable with respect to the sleeve portion 34 of the handle 20 for facilitating the handle 20 to be telescopically slideable with respect to the container 12.

Turning now to the materials for the handheld dispenser 10, it will be appreciated that the materials for the dispenser 10 may vary depending on the application of the dispenser 10. However, particularly where the dispenser 10 is for dispensing food powder (e.g., protein powder), in such embodiments the container 12, the rotatable member 18, and the handle 20, may be made of plastic, such as but not limited to a post consumer recycled, PCR, plastic. Not least in these embodiments, the use of plastic makes the dispenser 10 easier to clean. It will be appreciated, however, that other materials for the dispenser 10 or parts thereof may be used as required, for instance wood, or metal.

Staying with the materials for the handheld dispenser 10, in accordance with some embodiments, such as those shown in the Figures, to assist the user in being able to determine the remaining amount of powder in the powder storage volume 16, the container 12 or the powder storage volume 16 may be translucent or transparent, or at least partially translucent or transparent.

In accordance with some embodiments, to further assist the user in being able to determine the remaining amount of powder in the powder storage volume 16, the container 12 may further comprise a plurality of markings 64 for determining a level of powder in the powder storage volume 16. Such markings might, for instance as shown in the embodiments from the Figures, comprises a plurality of lines or graduations extending along a side of the container 12. The plurality of markings might also comprise a set of volumetric amount indicators, e.g., reciting at least one of imperial amounts (e.g. relating to ounces or pints) and/or metric amounts (e.g. relating to milliliters).

In terms of the applications of the handheld dispenser 10 described herein, as noted above, the dispenser 10 is principally intended for use in transferring, in a controlled way, food powder, such as food supplement powder or a protein powder, from a vessel in which the powder is located, into a receptacle such as a drink glass or a water bottle. With that in mind, a possible method of operation for the dispenser 10 is for a user to place powder into the powder storage volume 16 of the container 12, for instance the powder originating from a powder-containing vessel such as a tub of protein powder. Where the second opening 28 is provided, the powder may be placed into the powder storage volume 16 by being passed through the second opening 28.

Once the powder has been placed into the powder storage volume 16 of the container 12, the user may then locate the first opening 14 of the container 12 over an opening in a receptacle. Such a receptacle might for instance be a drink glass or a water bottle. Once done, the user then actuates the actuator 22 to allow the powder 100 located in the powder storage volume 16 of the container 12 to travel past the rotatable member 18, out from the first opening 14 of the container 12, and into the receptacle 200. This operation is shown best with reference to FIG. 6, where powder 100 can be seen to passing from the powder storage volume 16, past the rotatable member 18, and ultimately into the receptacle 200 therein shown as water bottle.

Figure 1:
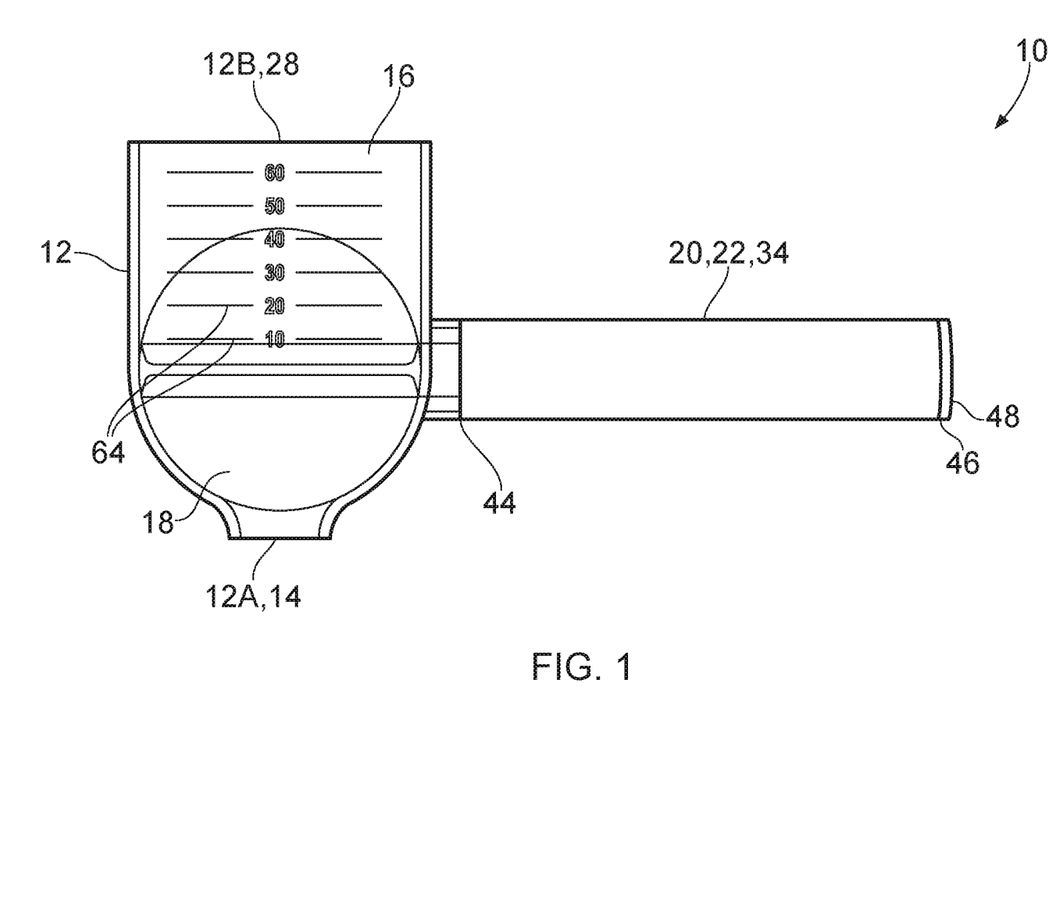
FIG. 1 shows a side view of a dispenser for dispensing a powder.
Figure 2A:
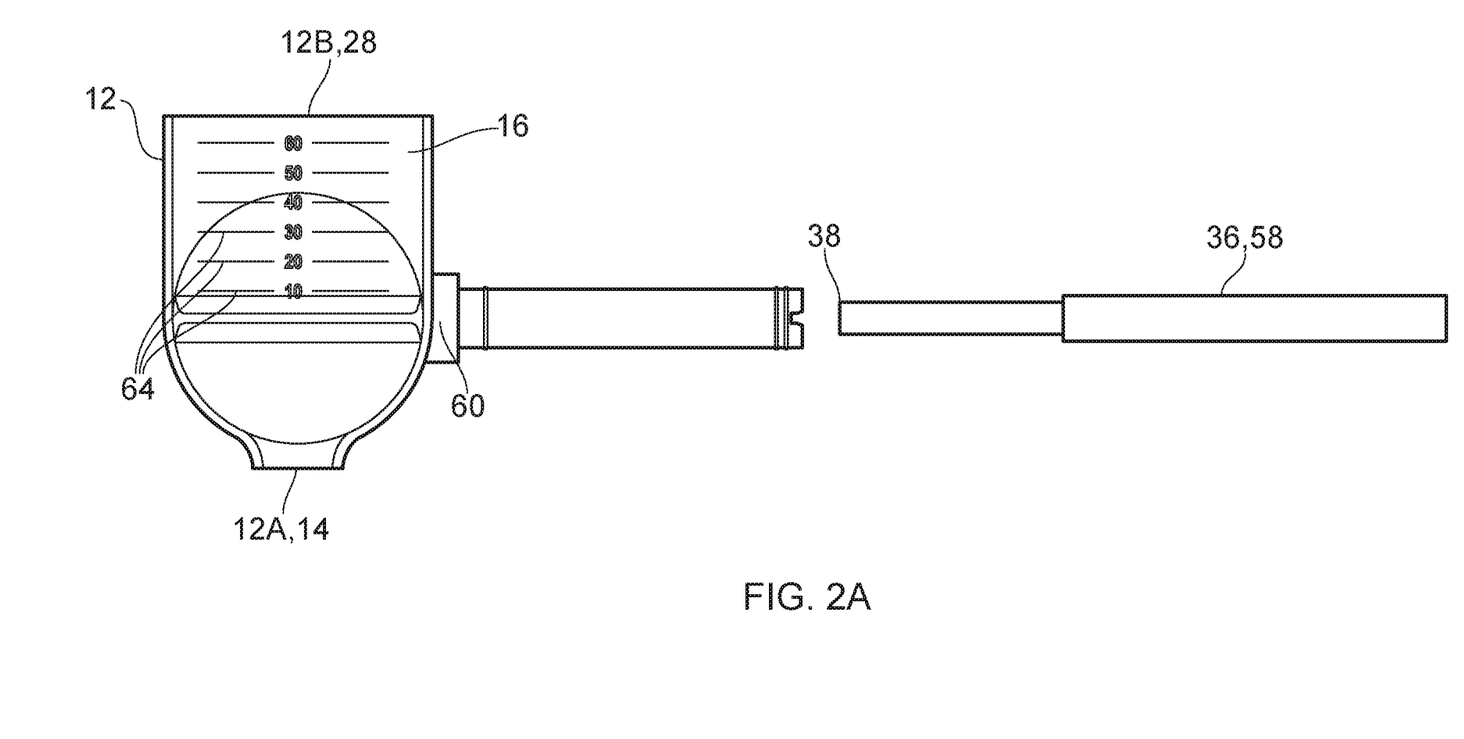
FIG. 2A shows a side view of a portion of the dispenser from FIG. 1 in an exploded position, and which principally shows the container and the rotatable member from the dispenser.
Figure 2B:
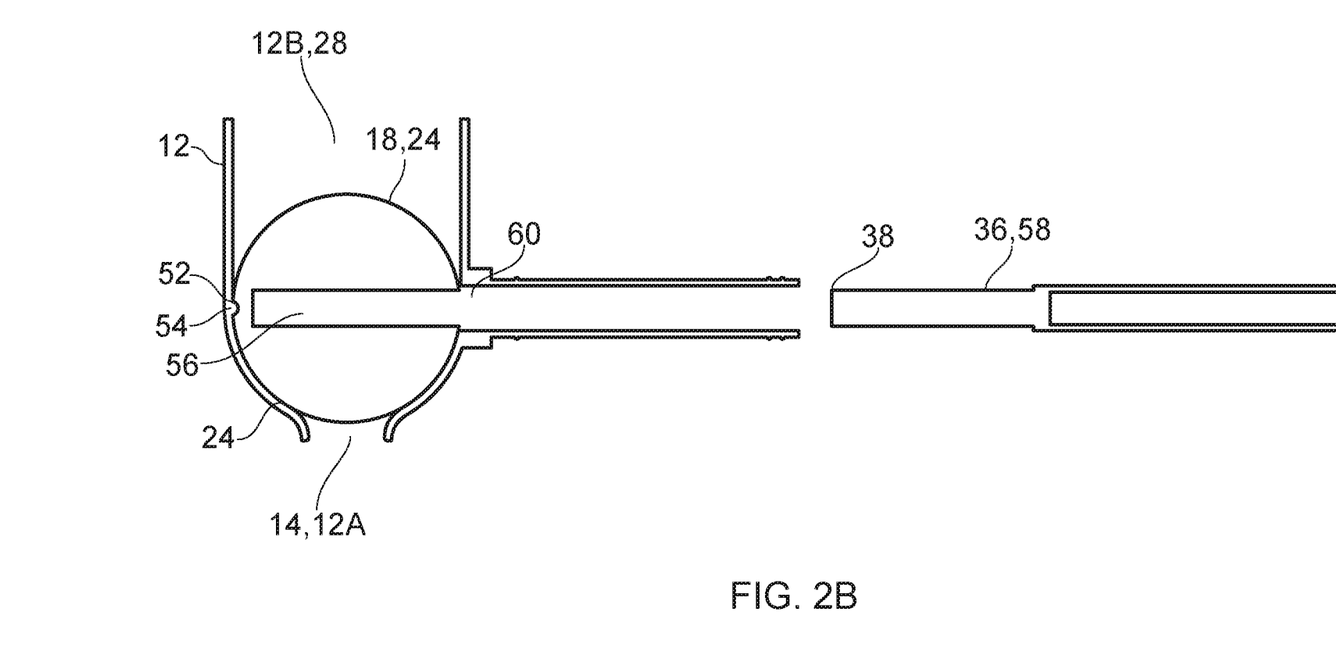
FIG. 2B shows a section view of the dispenser from FIG. 2A, wherein the section is taken about the plane that is halfway across the width of the dispenser from FIG. 2A.
Figure 2C:
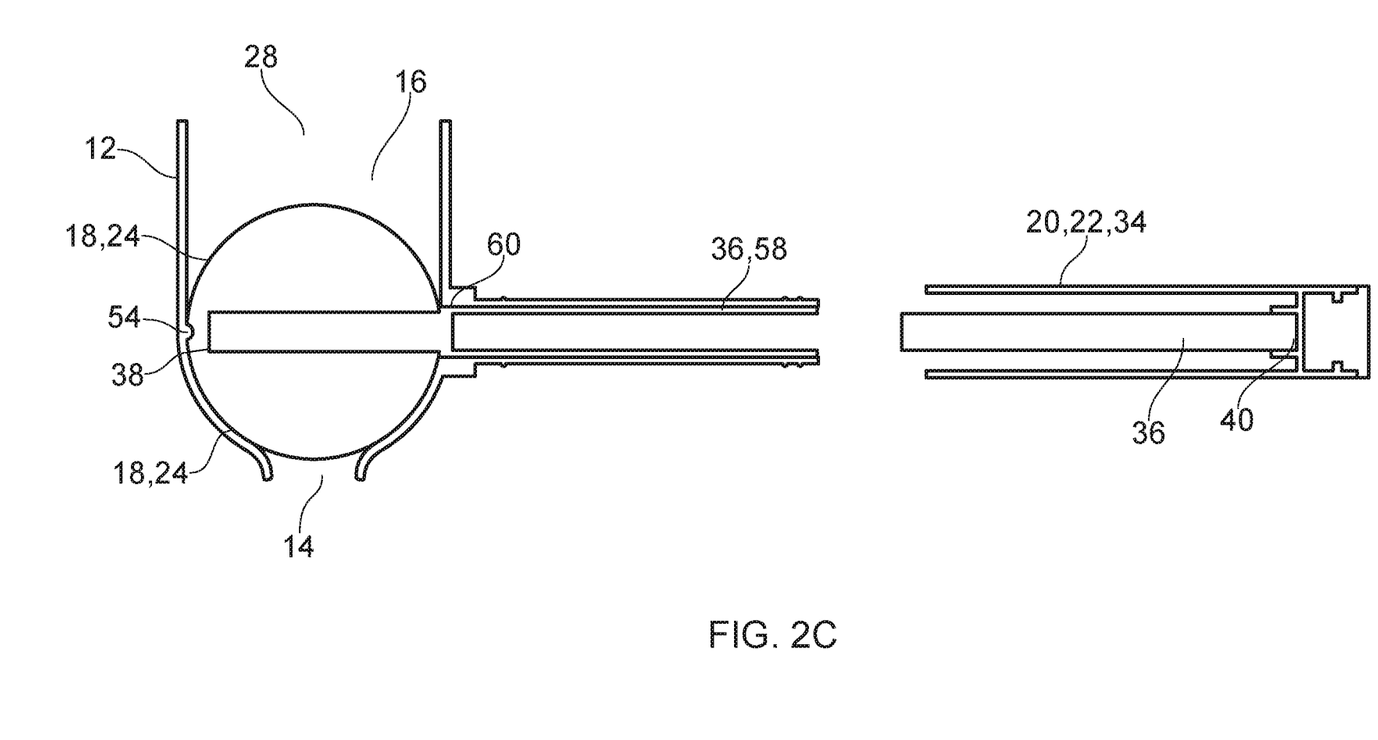
FIG. 2C shows a section view of a portion of the dispenser from FIG. 1 in an exploded position, wherein the section is taken about the plane that is halfway across the width of the dispenser from FIG. 1, and which principally shows the container; the rotatable member; and the handle from the dispenser.
Figure 2D:
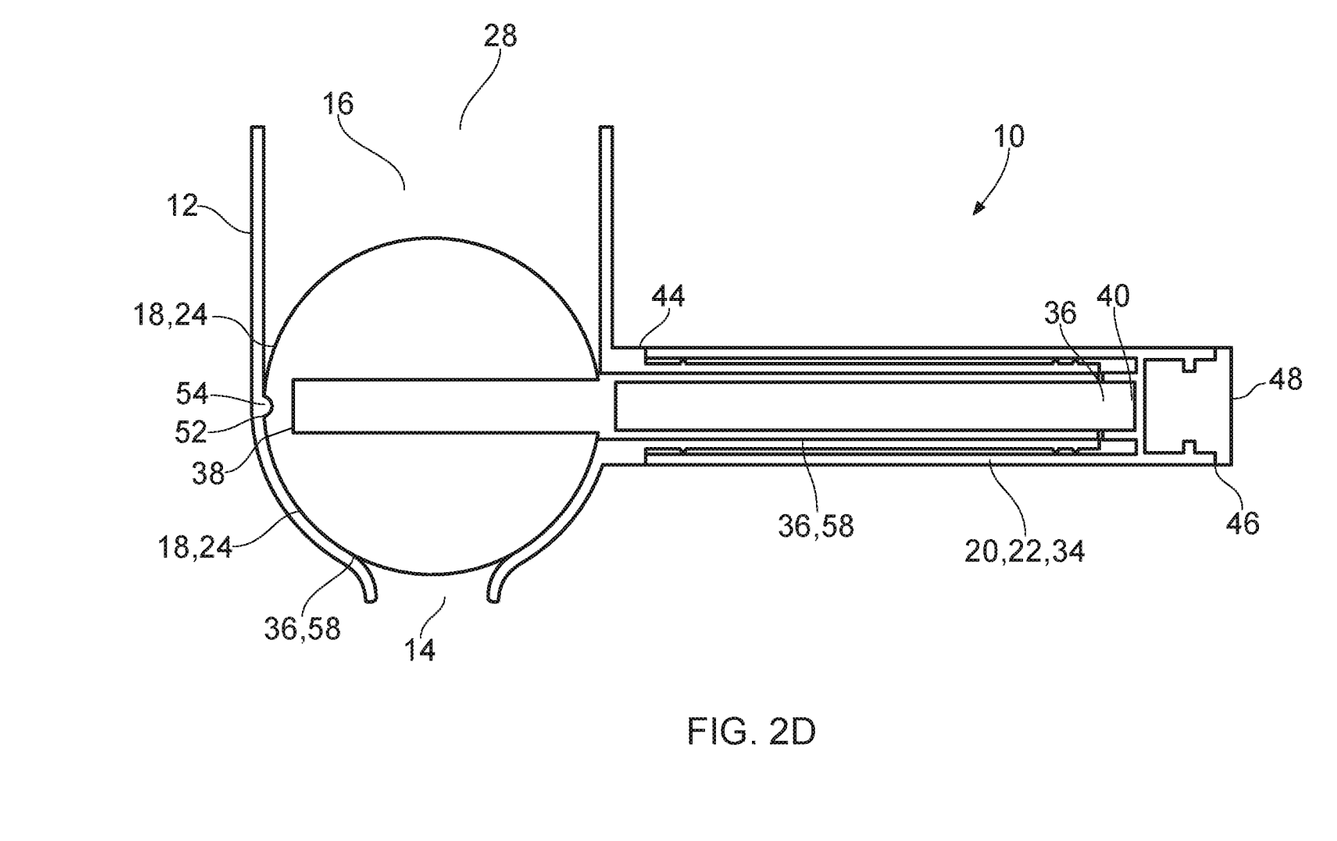
FIG. 2D shows a section view of the components from FIG. 2C in a non-exploded position, wherein the section is taken about the plane that is halfway across the width of the dispenser from FIG. 1, and which principally shows the container; the rotatable member; and the handle from the dispenser.
Figure 3:
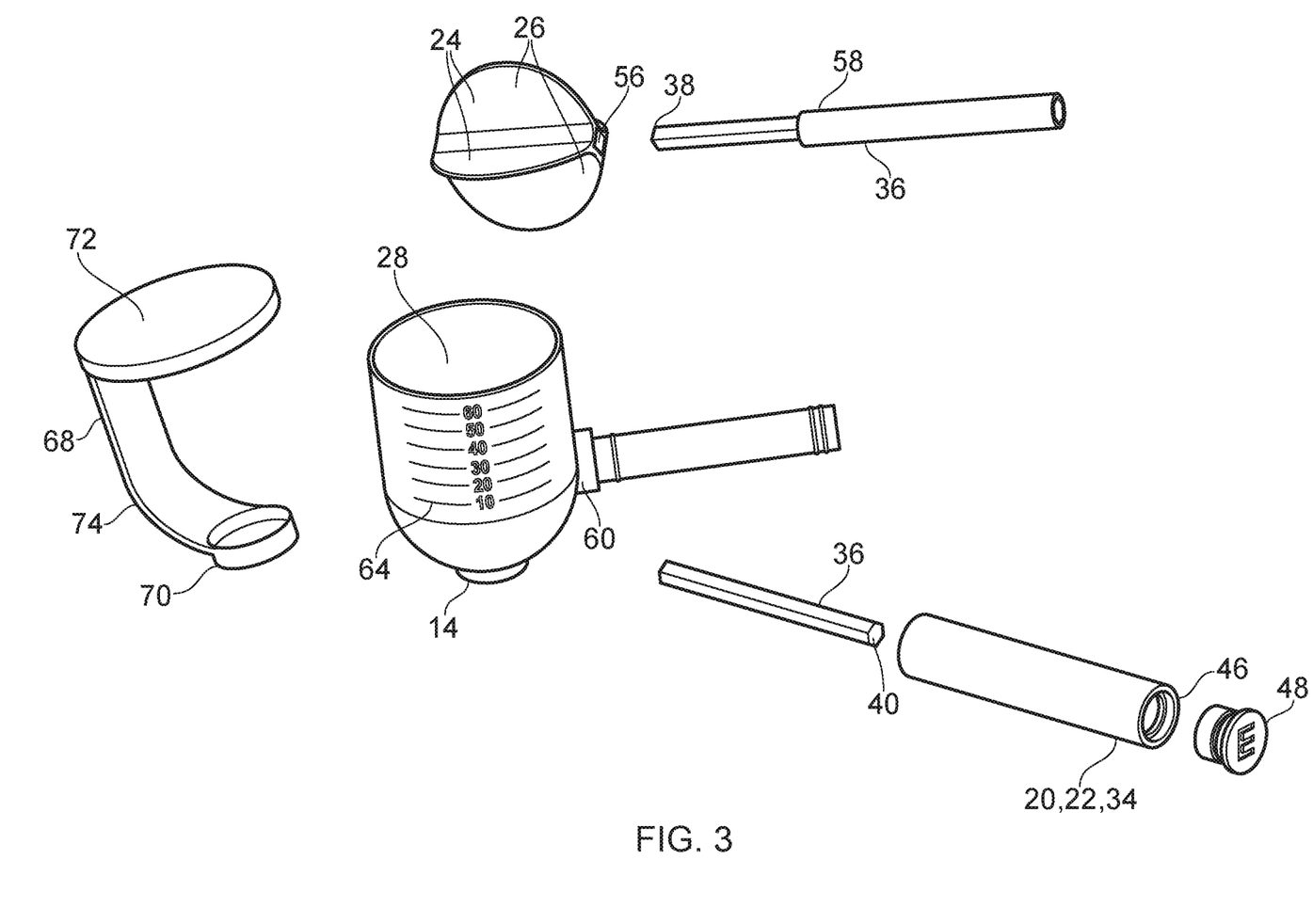
FIG. 3 shows an exploded perspective view of the dispenser from FIG. 1, wherein the dispenser is also shown as comprising a cover removably locatable over the first opening and the second opening of the container.

With particular reference to FIG. 3, in some embodiments of the dispenser 10, a cover 68 may be present that is locatable over the first opening 14 and/or the second opening 28 of the container 12 for covering the opening when it is not in use. The cover 68 might be rigid or flexible as required, and would be removable by the user when access to the relevant opening of the container 12 is required. In the particular embodiments where the container 12 of the dispenser comprises the second opening 28, in particular embodiments thereof, a flexible cover 68 may be provided which comprises a first portion 70 for covering the first opening 12, a second portion 72 for covering the second opening 28, wherein the first and second portions are connected together by a flexible spine 74 of the cover 68. In that embodiment, the flexible spine extends along an outer surface of the container 12 between the first opening 14 and the second opening 28. In the above embodiments, the cover 68 might in some particular embodiments be made of plastic, or a post consumer recycled, PCR, plastic.

Thus, from one perspective, there has now been disclosed a handheld dispenser for dispensing a powder, the dispenser comprising:

a container comprising a first opening, and a powder storage volume for storing the powder;

a rotatable member, located in the container;

a handle connected to the rotatable member; and an actuator at least partially located on the handle, wherein the actuator is actuatable to rotate the rotatable member in the container for allowing powder located in the powder storage volume of the container to travel past the rotatable member and out from the first opening;

wherein the powder storage volume is no more than 200 ml.

It will be appreciated that while the above description has focused on handheld dispensers for dispensing a powder comprising a number of different features, dispensers in accordance with other embodiments of the disclosure may not include all these features. For example, although the dispenser has been disclosed as a handheld dispenser, in principal the operation of the dispenser could be upsized such that the dispenser is no longer necessarily handheld.

Also, whilst the handheld dispenser has been disclosed as having a powder storage volume, for storing the powder, which is no more than 200 ml—for instance in applications where the dispenser is used for dispensing food powder (for instance a food supplement powder, such as a protein powder), it will be appreciated that in other applications of the dispenser, the container may have a powder storage volume of other sizes that are not necessarily no more than 200 ml.

Tying in with the above, although the handheld dispenser described herein has been principally disclosed as being used for dispensing food powder, other applications for the dispenser are envisaged. For instance, in one application the dispenser would be well suited for handling detergent powders, such as a laundry detergent or a dishwasher detergent. In that respect, noting such detergent powders can cause irritation to those having sensitive skin, the use of the present dispenser having its handle allows to the user to conveniently store and dispense the detergent in a way that is less likely to cause contact of the detergent on the user's skin.

Whatever the application for the handheld dispenser, in some embodiments the dispenser may be supplied as part of a vessel containing the powder which the dispenser is configured to dispense. There, in some particular embodiments, the dispenser may be supplied inside the vessel, or might be supplied in some other way with the vessel (e.g., attached to the outside of the vessel).

In terms of how the handheld dispenser 10 might be supplied, it is envisaged that the dispenser might be supplied individually, or might for instance be supplied as part of an assembly comprising a vessel for powder, and the dispenser 10 supplied with the vessel. In these latter arrangements, the dispenser might be supplied inside the vessel in which it is configured to be used with.

Figure 5A:
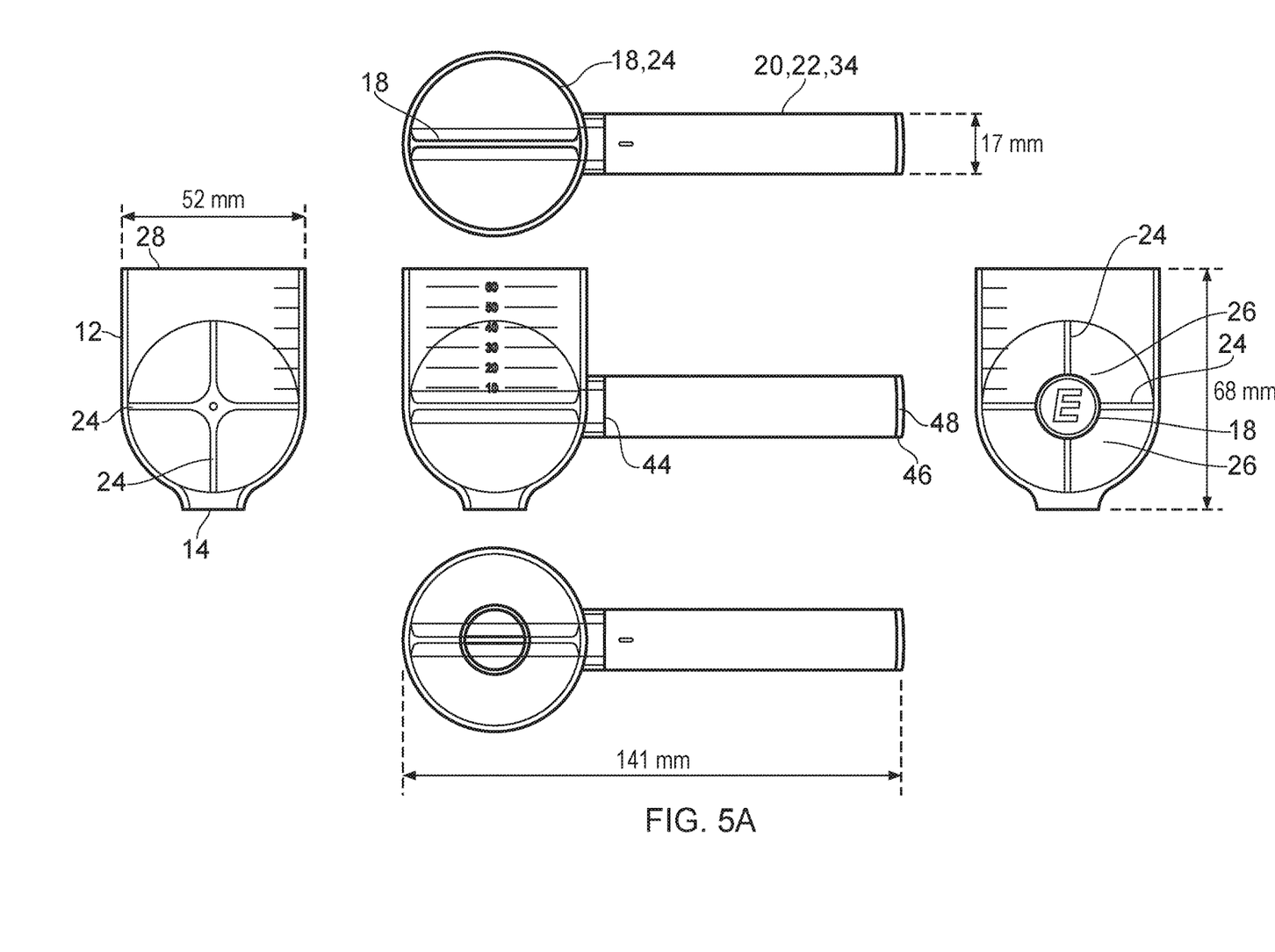
FIG. 5A shows a variety of views of an embodiment of dispenser similar to that shown in the previous Figures, wherein the container comprises a powder storage volume of a first, larger, size.
Figure 5B:
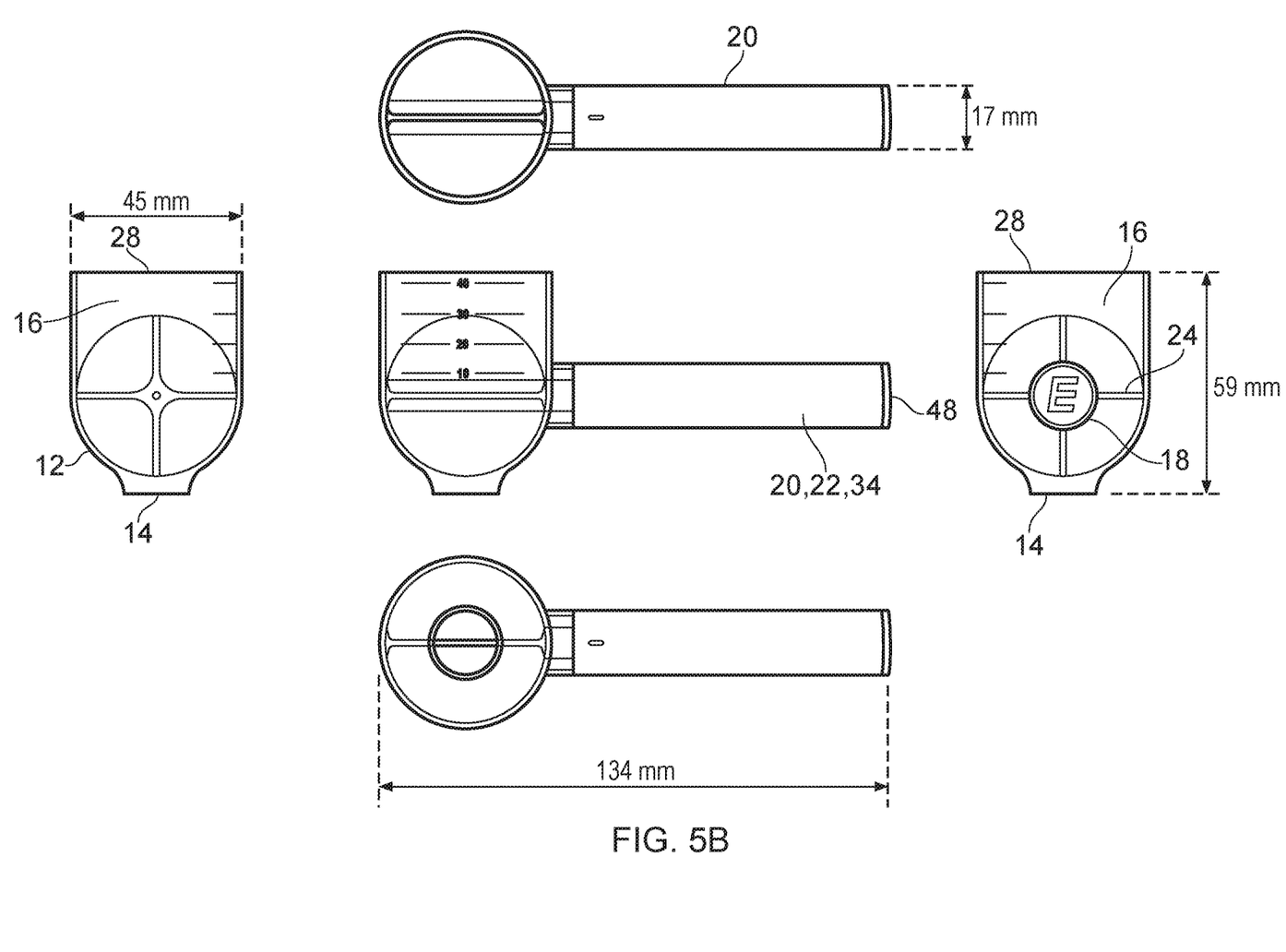
FIG. 5B shows a variety of views of an embodiment of dispenser similar to that shown in FIG. 5A, wherein the container comprises a powder storage volume of a second, intermediate, size.
Figure 5C:
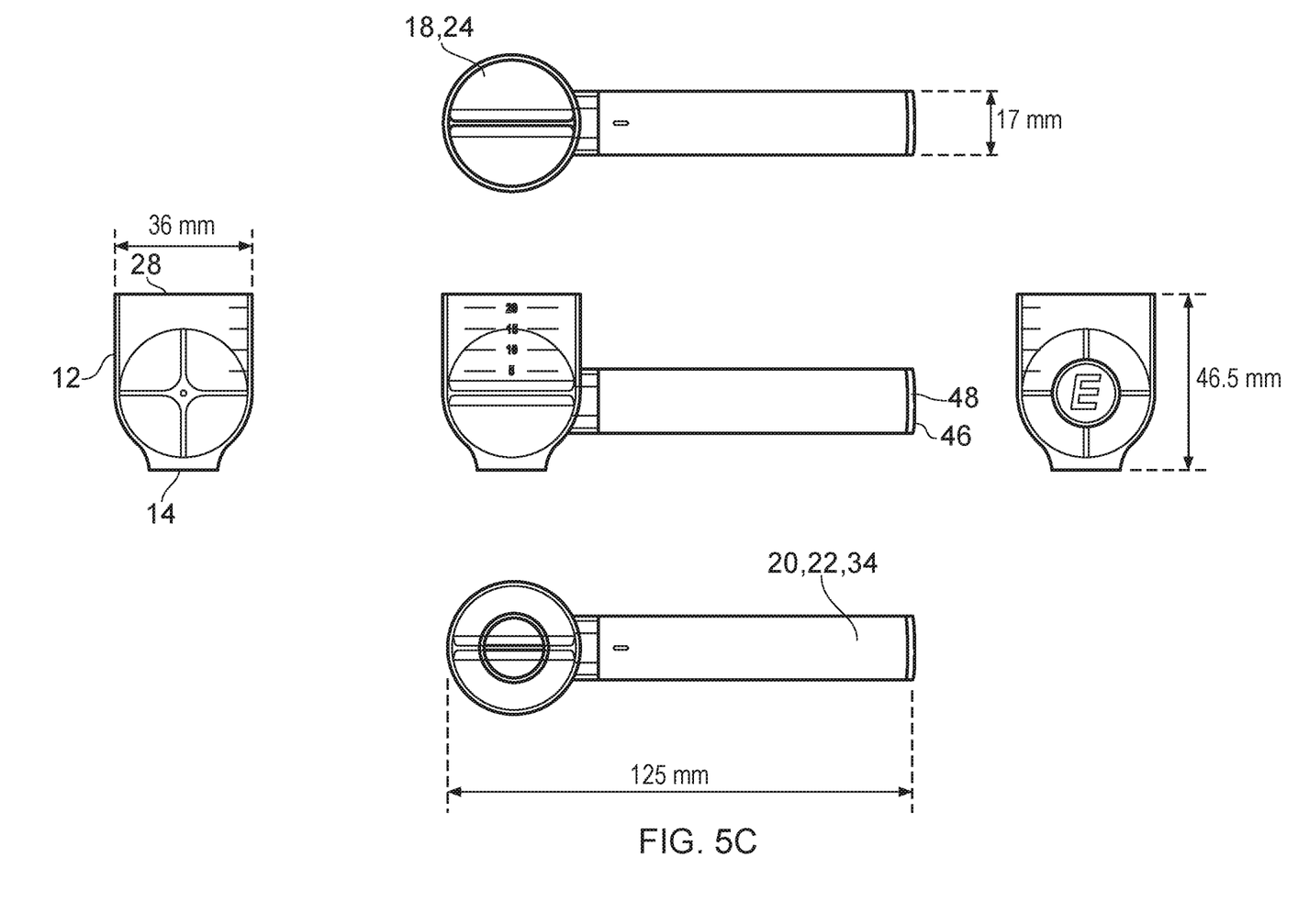
FIG. 5C shows a variety of views of an embodiment of dispenser similar to that shown in FIG. 5A, wherein the container comprises a powder storage volume of a third, smaller, size.
Figure 6:
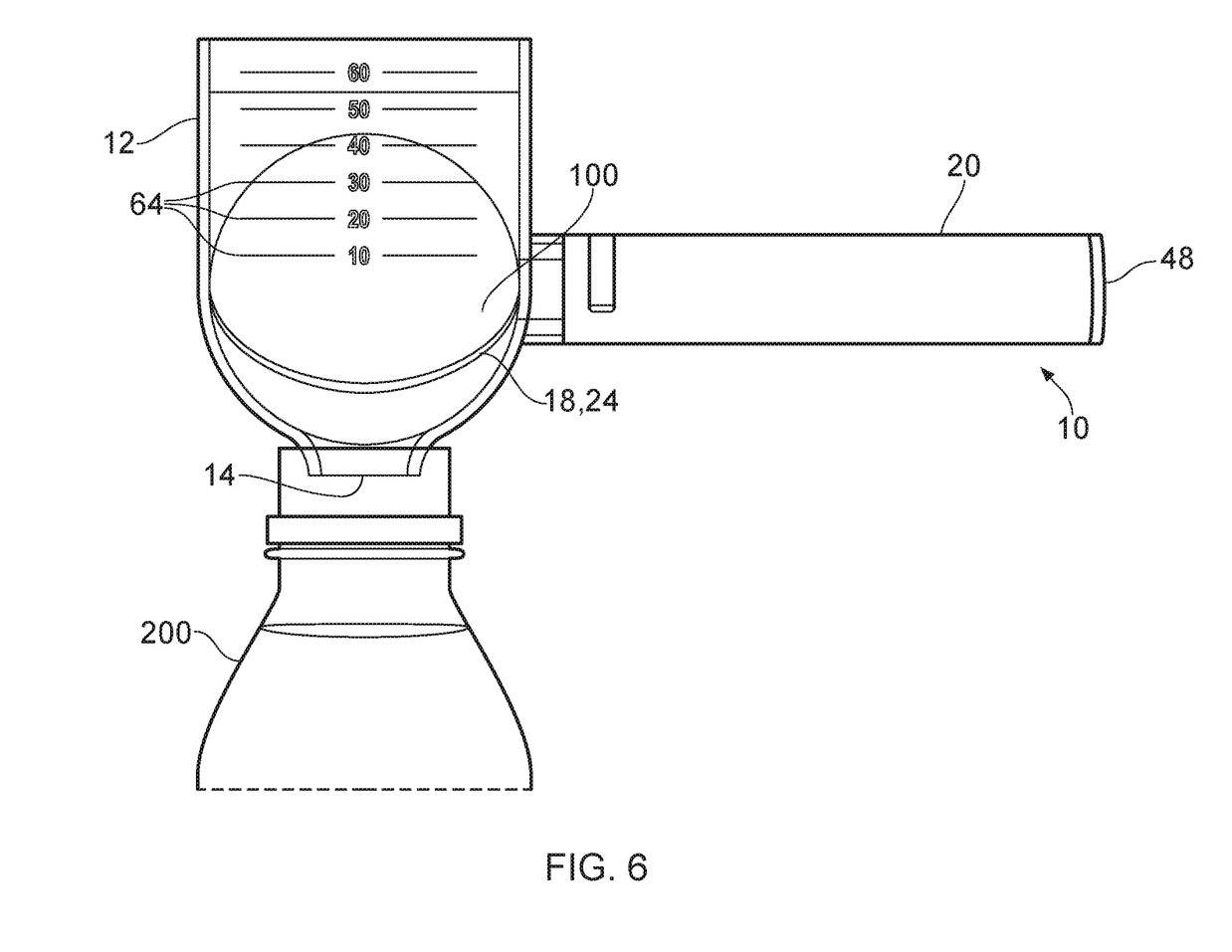
FIG. 6 shows a side view of the dispenser from FIG. 1, when filled with powder, and whilst in use over a receptacle such to allow powder located in the powder storage volume of the container to travel past the rotatable member, out from the first opening, and into the receptacle.

Noting the above example applications for the handheld dispenser, in accordance with some embodiments of the handheld dispenser, the handheld dispenser may have a maximum length of no more than 200 mm (as shown for instance in the embodiment of dispenser shown in FIG. 5A, where the maximum length of the dispenser is no more than 150 mm (in particular 141 mm).

In order to address various issues and advance the art, this disclosure shows by way of illustration various embodiments that may be practiced. The advantages and features of the disclosure are of a representative sample of embodiments only, and are not exhaustive and/or exclusive. They are presented only to assist in understanding and to teach the disclosure. It is to be understood that advantages, embodiments, examples, functions, features, structures, and/or other aspects of the disclosure are not to be considered limitations on the disclosure, and that other embodiments may be utilized and modifications may be made without departing from the scope of the disclosure. Various embodiments may suitably comprise, consist of, or consist essentially of, various combinations of the disclosed elements, components, features, parts, steps, means, etc. other than those specifically described herein, and it will thus be appreciated that features may be combined with features in combinations other than those explicitly set out. The disclosure may include inventions not presently claimed, but which may be claimed in future.

The invention claimed is:

1. A handheld dispenser for dispensing a powder, the dispenser comprising:
    a container comprising a first opening, and a powder storage volume for storing the powder;
    a rotatable member, located in the container;
    a handle connected to the rotatable member; and
    an actuator at least partially located on the handle, wherein the actuator is actuatable to rotate the rotatable member in the container for allowing powder located in the powder storage volume of the container to travel past the rotatable member and out from the first opening;
    wherein the actuator comprises a sleeve portion of the handle, wherein the sleeve portion is rotatable relative to the container and is connected to the rotatable member, wherein rotation of the sleeve portion relative to the container is configured to rotate the rotatable member in the container for allowing powder located in the powder storage volume to travel past the rotatable member and out from the first opening, and
    wherein the powder storage volume is no more than 200 ml.

2. The dispenser of claim 1, wherein the rotatable member comprises a plurality of paddles which define spaces between the paddles for receiving powder, wherein rotation of the rotatable member is operable to allow powder located in the container to travel in the spaces between the paddles and out from the first opening.

3. The dispenser of claim 2, wherein the spaces are the same size.

4. The dispenser of claim 2, wherein the rotatable member comprises four paddles and four spaces.

5. The dispenser of claim 1, wherein the actuator comprises a shaft member located inside the handle, wherein the sleeve portion is connected to the rotatable member by the shaft member.

6. The dispenser of claim 5, wherein a first end of the shaft member is connected to the rotatable member, and a second end of the shaft member is connected to the sleeve portion.

7. The dispenser of claim 1, wherein the handle comprises a distal end connectable to the container, and a proximal end located opposite the distal end.

8. The dispenser of claim 1, wherein the container comprises a second opening for allowing the container to be filled with powder.

9. The dispenser of claim 8, wherein the first opening is located at a first end of the container, and the second opening is located at a second end of the container which is opposite the first end.

10. The dispenser of claim 8, wherein the second opening is larger than the first opening.

11. The dispenser according of claim 1, wherein the handle is telescopically slideable with respect to the container.

12. The dispenser of claim 1, wherein the container comprises a plurality of markings for determining a level of powder in the powder storage volume.

13. The dispenser of claim 1, further comprising a cover that is locatable over each opening of the container.

14. The dispenser according of claim 1, wherein the dispenser has a maximum length of no more than 200 mm.

15. The dispenser of claim 1, wherein the container is translucent or transparent.

16. The dispenser of claim 1, wherein the dispenser is a food powder dispenser or a protein powder dispenser.

17. A method of dispensing powder from a handheld dispenser including a container comprising a first opening and a powder storage volume for storing the powder, a rotatable member located in the container, a handle connected to the rotatable member and an actuator at least partially located on the handle, wherein the actuator is actuatable to rotate the rotatable member in the container for allowing powder located in the powder storage volume of the container to travel past the rotatable member and out from the first opening, wherein the actuator comprises a sleeve portion of the handle, wherein the sleeve portion is rotatable relative to the container and is connected to the rotatable member, wherein rotation of the sleeve portion relative to the container is configured to rotate the rotatable member in the container for allowing powder located in the powder storage volume to travel past the rotatable member and out from the first opening, and wherein the powder storage volume is no more than 200 ml, wherein the method comprises:
    placing powder into the powder storage volume of the container;
    locating the first opening of the container over an opening of a receptacle;
    actuating the actuator to allow the powder located in the powder storage volume of the container to travel past the rotatable member, out from the first opening of the container, and into the receptacle.

18. The method of claim 17, wherein the powder comprises food powder or protein powder.

19. An assembly comprising a vessel for powder, and a handheld dispenser including a container comprising a first opening and a powder storage volume for storing the powder, a rotatable member located in the container, a handle connected to the rotatable member and an actuator at least partially located on the handle, wherein the actuator is actuatable to rotate the rotatable member in the container for allowing powder located in the powder storage volume of the container to travel past the rotatable member and out from the first opening;
    wherein the actuator comprises a sleeve portion of the handle, wherein the sleeve portion is rotatable relative to the container and is connected to the rotatable member, wherein rotation of the sleeve portion relative to the container is configured to rotate the rotatable member in the container for allowing powder located in the powder storage volume to travel past the rotatable member and out from the first opening, and
    wherein the powder storage volume is no more than 200 ml, wherein the dispenser is for receiving the powder from the vessel, and for storing the powder in the powder storage volume of the container of the dispenser.

* * * * *